Patented Aug. 2, 1938

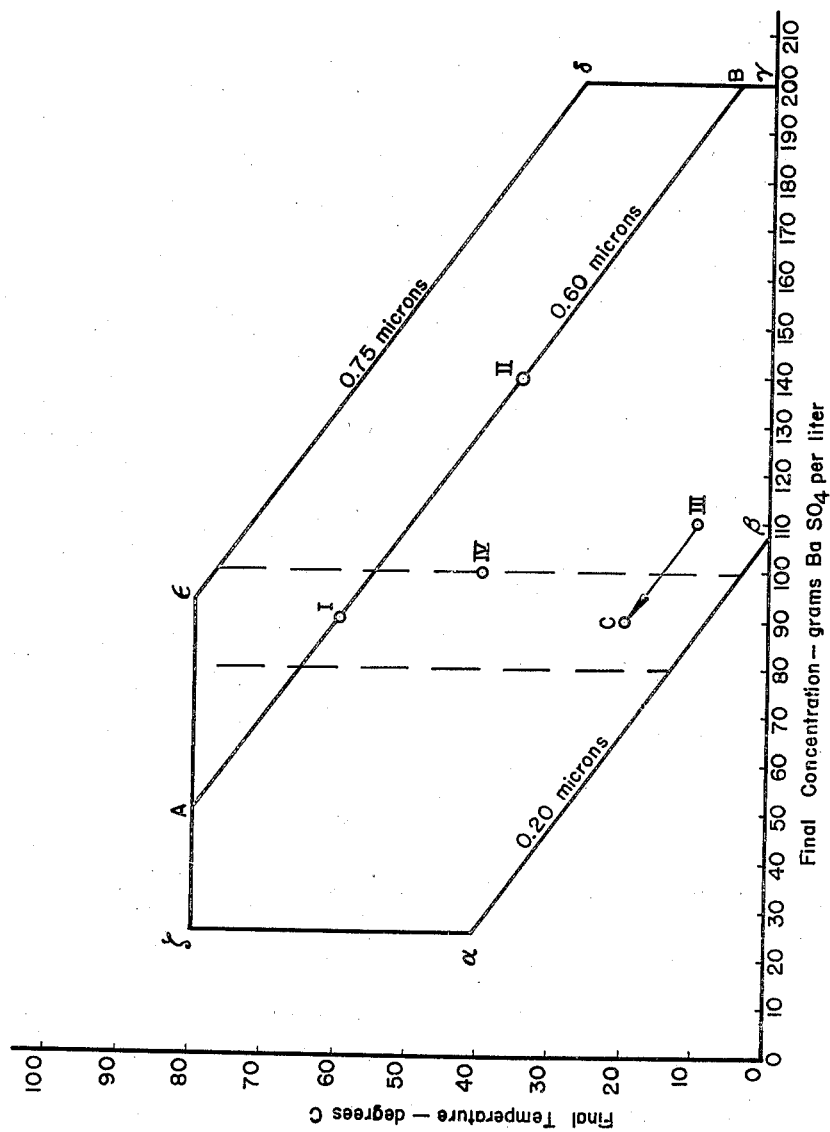

2,125,342

UNITED STATES PATENT OFFICE 2,125,342

PROCESS OF MAKING PIGMENT BARIUM SULPHATE FROM BARIUM CHLORIDE

Daniel C. Hall, Silview, and Edward F. Steinbring, Wilmington, Del., assignors, by mesne assignments, to E. I. du Pont de Nemours and Company, a corporation of Delaware Application November 4, 1935, Serial No. 48,146

4 Claims. (Cl. 23—122)

This invention relates to the production of pigment barium sulphate, and more particularly to its production from barium chloride under certain well-defined and carefully controlled conditions of temperature and concentration.

It is well known that sulphuric acid and barium chloride will precipitate barium sulphate but products obtained in this manner have always been deficient in some properties, and have not been available for pigment purposes. The few types of barium sulphate known heretofore which had oil absorption values in a normal range had poor color or poor tinting strength, or both poor color and poor tinting strength.

The attached drawing shows graphically the conditions under which we operate the precipitation of barium sulphate from barium chloride and sulphuric acid according to our invention.

In this drawing, the figures of final concentration of barium sulphate in the reaction slurry are given in grams per liter on the horizontal axis; the final temperatures in degrees centigrade are plotted on the vertical axis.

The field of our invention is shown by the area enclosed within the points alpha, beta, gamma, delta, epsilon, and zeta.

On line AB those conditions will be found which produce a barium sulphate of about 0.60 micron frequency particle size average. The limiting lines alpha-beta and epsilon-delta indicate conditions under which frequency particle sizes of about 0.20 and 0.75 micron respectively will be produced. Any lines parallel to AB describe conditions under which the same frequency particle averages can be obtained.

Points I, II, III, IV, and C indicate conditions specifically discussed in the examples given below.

The conditions of concentration and reaction temperature when making barium sulphate from barium chloride and sulphuric acid have a considerable effect upon the particle size of the precipitated barium sulphate, which latter influences the oil absorption and related properties. The color and reflectance are also influenced by the precipitating conditions, and particularly by the purity of the solutions employed.

"Particle size" as used herein refers to the "frequency particle size average", which may be described as the number-weighted average diameter, defined by the expression $$F.P.S.A. = \frac{n_1 d_1 + n_2 d_2 + n_3 d_3 + \cdots\cdots + n_m d_m}{n_1 + n_2 + n_3 + \cdots\cdots + n_m}$$

where $n_1$ is the number of particles in a size class the average diameter of which is $d_1$; $n_2$ is the number of particles in a size class, the average diameter of which is $d_2$; and so on until the largest size class counted ($n_m$, $d_m$) is reached.

The method of measurement is essentially that described by Henry Green in the Paint, Oil, and Chemical Review, volume 28, #10, page 10, March 10, 1927. Pigment dispersions were prepared in a mixture of 66% Canada balsam, 20% Michler's ketone, and 14% asphaltum. The preparations were photographed at 1,500 diameters (except for very coarse material) using transmitted ultraviolet light of 366 millimicrons from a mercury arc. The initial photographs were enlarged 3⅓ times to a total magnification of 5,000 diameters. Particles were classified in ½ mm. intervals, corresponding to 0.1 micron actual size.

Each determination was based upon a count of at least 750 particles classified into the above size classes measuring in each case the horizontal diameter. The frequency particle size distribution thus obtained was then converted to a frequency percent distribution, yielding the percentage of particles in each class.

The optical system used is incapable of resolving material below approximately 0.2 micron in diameter. However, it would appear unnecessary for the purpose of the present invention to give consideration to particles of a fineness below about 0.2 micron, as the determining factor in our invention is the absence of substantial amounts of particles above certain limits.

The smaller the particle size of the barium sulphate, the greater is the oil absorption, probably because the latter is related to the relative amount of surface presented to the oil by the barium sulphate. It is obvious from mathematical considerations that the total surface presented by a given amount of a solid increases as the particle size is reduced.

Oil absorption is recorded as the amount of oil, in grams, required to wet 100 grams of pigment. The method of testing is described by H. A. Gardner in "Physical and Chemical Examination of Paints, Varnishes, Lacquers, and Colors", 1933 edition, on pages 475–477. A 5 gram sample is used. Acid refined linseed oil of acid number 12.5 is added slowly from a burette and worked into the pigment with a spatula on a smooth glass plate. The addition of oil is continued a drop or two at a time until the pigment can be collected in one coherent mass, adhering to the spatula but not wetting the glass. The amount of oil used to wet the pigment is read from the burette.

By controlling precipitating conditions, one is enabled by our novel process to obtain barium sulphate over a wide range of frequency particle size averages. It is within the range of 0.75 micron down to about 0.2 micron F. P. S. A. that the most satisfactory barium sulphates are produced. The letters F. P. S. A. are used herein as an abbreviation for frequency particle size average.

Above 0.75 micron, the oil absorption is low and the color and brightness are poor.

Our novel process consists of mixing pure sulphuric acid and pure barium chloride solution under controlled conditions. The barium chloride solution is conveniently purified by rendering it alkaline to a pH of between 8.0 to 9.0, oxidizing any iron to the ferric condition and removing the precipitate by filtration.

In its preferred form, our process consists in correlating the final precipitating temperature and the concentration of the precipitated barium sulphate in its mother liquor within certain limits as shown in the attached figure.

We have found that there exists a definite relationship between these temperature and concentration conditions which can be expressed by a linear function, according to which, by a given formula, we can by specified amounts increase or decrease the temperature and concentration and obtain certain particle size characteristics in the precipitated barium sulphate.

The field within which these relations hold true and which field comprises our invention can be limited as follows:

For a concentration of 25 grams per liter BaSO4 in the mother liquor, and for the obtention of a barium sulphate of a particle size between 0.2 and 0.75 micron F. P. S. A., the final temperature should be between 40° and 80° C. When the final concentration is increased from about 25 to about 105 grams per liter, the final temperature should correspondingly be not less than 40° to 0° C. and on continued increase of the final concentration, the end temperature should remain not less than 0° C.

On the other hand, when the concentration of barium sulphate in its mother liquor is increased from 25 to about 95 grams per liter, the final temperature should not exceed 80° C. and on further increase of the final concentration from 95 to 200 grams per liter, the final temperature should correspondingly decrease below the range from 80° to 36° C.

It appears furthermore that for the most practical operating conditions which involve final barium sulphate concentrations of from 80 to 100 grams per liter, the end temperature should be between about 15° to 75° C.

For extremely fine particle size barium sulphate, such as F. P. S. A. of around 0.2 micron, the precipitation is conducted at a low temperature, for instance, near the freezing point, as obtained by brine cooling. About 0° C. is the practical limit of cooling. At room temperature and up to 80° C., a very useful barium sulphate is obtained which is of relatively high oil absorption, which is often desirable especially in certain paint and rubber compositions.

Temperatures above 80° C. and for other temperatures and concentrations than those herein exemplified, the precipitated barium sulphate becomes too coarse.

To illustrate the effect of different temperatures upon the precipitated barium sulphate, the following table is presented.

The final concentration of barium sulphate in the slurry was 97 grams per liter in each case.

| Final strike temperature in 0° C. | 12 | 26 | 40 | 60 | 78 | 92 |
|---|---|---|---|---|---|---|
| Oil absorption | 18.0 | 16.6 | 13.7 | 11.5 | 11.1 | 10.3 |
| F. P. S. A. microns | 0.25 | 0.32 | 0.43 | 0.71 | 0.78 | 0.86 |

As a practical matter, the final concentration of the barium sulphate in its mother liquor of between 25 to 200 grams per liter will give the desired particle size, and other characteristics within the limits of temperature specified above. Within the upper range of concentrations, the disadvantage arises that there is a considerable amount of hydrochloric acid retained in the precipitate which has to be washed out and the dilute solution of hydrochloric acid obtained cannot be recovered economically. On the other hand, if the concentration of BaSO4 in the mother liquor is low, the slurry obtained is very bulky and difficult to handle economically. The preferred conditions where the final slurry contains from 80 to 100 grams of barium sulphate per liter strikes a compromise between these two difficulties.

The precipitated barium sulphate is filtered and washed free from the hydrochloric acid mother liquor. This latter may of course be recovered and used for the preparation of more barium chloride solution. The washed cake is repulped in water to any convenient concentration and adjusted to neutrality by small additions of alkali to give the final product. This may be filtered, dried, and dry-ground before use.

The following examples are intended to be illustrative only, and are not to be construed as limiting the nature or scope of the invention in any way:

*Example I.*—275 liters of barium chloride solution containing 56 grams of barium per liter were purified by adjusting the pH to 8.0 with BaS solution and filtering. The purified filtrate was run into a wooden tank fitted with wooden agitator and rubber steam inlet. All exposed metal parts in this tank were constructed of acid-proof metal. The solution was heated to 50° C. by admitting live steam, during which operation the condensation of the steam caused dilution to 54 grams of barium per liter. Slightly less than the calculated quantity of 66° Bé. H2SO4 at 25° C. was then added over a period of about 15 minutes with constant agitation, adjusting the endpoint to a very slight excess of sulphate-ion by further additions of acid. During the addition of the acid, the temperature rose to 60° C. The final concentration of barium sulphate in the slurry was 90 grams per liter.

The precipitated barium sulphate was then filtered from the hydrochloric acid mother liquor in a wooden plate and frame washing press, all connections and fittings of which were of acid-proof metal. Acid-proof pipe lines and an acid-proof pump were also used for conveying the slurry to the press. The acid filtrate was reserved for a subsequent preparation of more barium chloride solution. The barium sulphate cake was then partially washed with water in the press to remove most of the adhering mother liquor, and then washed further by repulping in water and filtering a second time. After the second filtration, the cake was again press-washed until the filtrate had a pH of 4.0 to 5.0. The amount of washing at this stage is of course dependent on the efficiency of the first wash and the amount of water used in repulping the first filter cake.

The washed cake was then repulped in sufficient water to give a slurry containing about 35% solids and adjusted to neutrality by small additions of sodium hydroxide, filtered and dried to give the final product of the invention. Its frequency particle size average was of the order of 0.6 micron and at least 90% of the particles were not greater than 1.5 microns.

We have found that within reasonable limits the particle size of the barium sulphate can be controlled. Taking as a basis Example I, which illustrates our preferred conditions for producing barium sulphate, and which gives barium sulphate with a frequency particle size average of about 0.6 micron, if the final concentration is kept constant, the particle size may be made larger or smaller by raising the temperature 13.1° C. for each 0.1 micron larger particle size desired, or lowering the temperature a like amount to reduce the particle size by 0.1 micron. If the temperature is held constant, the particle size is increased 0.1 micron with each increase of 26.2 grams per liter increase in the final concentration of the $BaSO_4$ in the slurry, or the particle size can be decreased with a decrease of like proportion of the concentration of the $BaSO_4$. These two effects may be combined in various ways, one of which is illustrated by Example II. In this example, the concentration of the $BaSO_4$ has been increased compared to that of Example I, but the temperature has been reduced by an amount so calculated as to compensate for the increase in the concentration and thus to produce a barium sulphate of the same particle size as that of Example I.

Comparing the foregoing proportions, a change of 2 grams per liter in the final concentration of the $BaSO_4$ is equivalent to a 1° C. change in the temperature. This relation is illustrated by the line AB in the drawing, corresponding to Examples I and II, and by any line parallel to AB, any point on which line will produce barium sulphate the same particle size as that produced by another point on the same line. For higher concentrations, the temperature must be lowered, and for lesser concentrations the temperature must be raised to give equal particle size.

*Example II.*—275 liters of barium chloride solution containing 85 grams of barium per liter were purified and run into a wooden tank as in Example I. The temperature of the solution was adjusted to 25° C. by admitting a small amount of live steam, and the precipitation was then conducted with 66° Bé. $H_2SO_4$ at 25° C. as in Example I. The temperature rose to 35° C. during addition of the acid. The final concentration of $BaSO_4$ was 140 grams per liter. The precipitate was then filtered, washed, and treated exactly as in Example I, and the final product was practically identical with that obtained in Example I.

*Example III* illustrates the effect of reducing the temperature without increasing the concentration sufficiently to compensate, the result being a barium sulfate of considerably smaller particle size. The temperature has been reduced 50° C. which would require an increase of 100 grams per liter in the concentration of barium sulphate to give equal particle size, but the concentration has been increased only 20 grams per liter. The difference, 80 grams per liter, divided by our factor, 26.2, shows that the particle size will be 0.3 micron smaller than that of Example I, which we find to be true.

In this example 275 liters of barium chloride solution containing 90 grams of barium per liter were prepared as in the previous examples and then adjusted to 8° C. by means of ice. The concentration of the barium was reduced to 67 grams per liter by the total dilution with ice. By means of further addition of ice during the precipitation with 66° Bé. $H_2SO_4$ at 25 C., a temperature rise to only 10° C. was allowed. The final concentration of $BaSO_4$ was 110 grams per liter. The precipitate was handled as in the previous examples.

The product was different from the product of Examples I and II in that its F. P. S. A. was of the order of 0.3 micron, and it was more difficult to filter and wash than the other products. This pigment has a special value where very fine particle size or high oil absorption is desired. If a barium sulphate of the properties of the material of Example III is desired, and if one wishes to operate within a preferred concentration range of 80 to 100 grams of barium sulphate per liter of slurry, one draws a line through 0.3 in the drawing parallel to AB. Any point on this line within the field of 80 to 100 grams per liter, as indicated on the drawing by the two broken vertical lines, will produce such a material. If we select, for instance, point C, we shall see that its temperature condition is 40° less than the conditions in Example I, which also operates in this preferred range. Dividing this difference in temperature by the factor 13.1 indicated above, it will be seen that a particle size of the product made at C will be 0.3 micron less than the size of the product in Example I. This has been found to be correct.

*Example IV.*—275 liters of barium chloride solution containing 62 grams of barium per liter were purified and run into a wooden tank as in Example I. The temperature of the solution was adjusted to 33 C. by admitting live steam, and the precipitation was then conducted with 66° Bé. $H_2SO_4$ at 25° C. as in Example I. The temperature rose to 40° C. during addition of the acid. The final concentration of $BaSO_4$ was 100 grams per liter. The precipitate was then filtered, washed, and treated as in Example I, and the final product had a frequency particle size average of 0.5 micron.

By use of our novel process herein described, it becomes possible to produce barium sulphate of superior and definitely controlled quality, particularly with respect to particle size and oil absorption.

We claim:

1. A process for the controlled production of barium sulphate having a frequency particle size average of about .6 micron, comprising reacting relatively pure solutions of barium chloride and sulphuric acid, and so regulating the concentration and temperature of the reactants that the final concentration of barium sulphate in the slurry is about 80 g/1 and the final precipitating temperature is about 65° C.

2. The process for producing barium sulphate having a frequency particle size average ranging below .6 and down to .2 micron, comprising the steps of reacting relatively pure solutions of barium chloride and sulphuric acid, correlating the final precipitating temperatures with the final barium sulphate concentrations to produce particles of a substantially uniform single particle size within the above range, employing final precipitating temperatures ranging from 65-15° C., and for each desired .1 micron reduction below .6 in particle size barium sulphate, reducing the final precipitating temperature about 13.1° C. below 65° C., but not below 15° C., while maintaining the final barium sulphate concentration constant and at a definite figure within 80–100 g/1.

3. The process for producing barium sulphate having a frequency particle size average ranging above .6 micron and below .75 micron, comprising the steps of reacting relatively pure solutions of barium chloride and sulphuric acid, correlating the final precipitating temperatures with the final barium sulphate concentrations to produce particles of a substantially uniform single particle size within the above range, employing final precipitating temperatures ranging from 55–75 C., and for each desired .1 micron increase above .6 in particle size barium sulphate, increasing the final precipitating temperature about 13.1° C. above 55° C., but not above 75° C., while maintaining the final barium sulphate concentration constant and at a definite figure within 80–100 g/1.

4. A process for the controlled production of barium sulphate of about .6 micron frequency particle size average, comprising reacting relatively pure solutions of barium chloride and sulphuric acid to produce a barium sulphate slurry, so regulating the final concentration and temperature of the barium sulphate slurry that a concentration within the range of 30–100 gm/1 and a temperature within the range of 65°–55° C. are obtained, in such manner that for each 2 gm/1 increase in barium sulphate concentration above 80 gm/1 the temperature is reduced 1° C. below 65° C., the final barium sulphate concentration not exceeding 100 gm/1 and the final temperature being not less than substantially 55° C.

DANIEL C. HALL.
EDWARD F. STEINBRING.